(No Model.)

S. J. HENDRIX & H. E. FILER.
DRINKING FOUNTAIN FOR FOWLS.

No. 583,574. Patented June 1, 1897.

Witnesses
A. M. Paynton.
J. F. Riley

Inventors
Sherman J. Hendrix and
Hobert E. Filer
By their Attorneys,
C. A. Snow & Co.

UNITED STATES PATENT OFFICE.

SHERMAN J. HENDRIX AND HOBERT E. FILER, OF LAURENS, NEW YORK; SAID FILER ASSIGNOR TO SAID HENDRIX.

DRINKING-FOUNTAIN FOR FOWLS.

SPECIFICATION forming part of Letters Patent No. 583,574, dated June 1, 1897.

Application filed April 8, 1896. Serial No. 586,722. (No model.)

*To all whom it may concern:*

Be it known that we, SHERMAN J. HENDRIX and HOBERT E. FILER, citizens of the United States, residing at Laurens, in the county of Otsego and State of New York, have invented a new and useful Drinking-Fountain for Fowls, of which the following is a specification.

Our invention relates to drinking-fountains for fowls, and has for its object to provide a simple and efficient construction and arrangement of parts, including a trough or receptacle which alone is accessible to the stock and a reservoir consisting of a bucket detachably connected to the trough or receptacle and adapted to be removed for the purpose of filling, the attachments to the reservoir being such as to be applicable to an ordinary water-bucket, and, furthermore, to provide means of connection between the reservoir and the trough or receptacle whereby vertical and lateral displacement of the former are prevented and whereby the disconnection thereof can be accomplished solely by a partial rotation thereof.

Further objects and advantages of this invention will appear in the following description, and the novel features thereof will be particularly pointed out in the appended claims.

Figure 1:
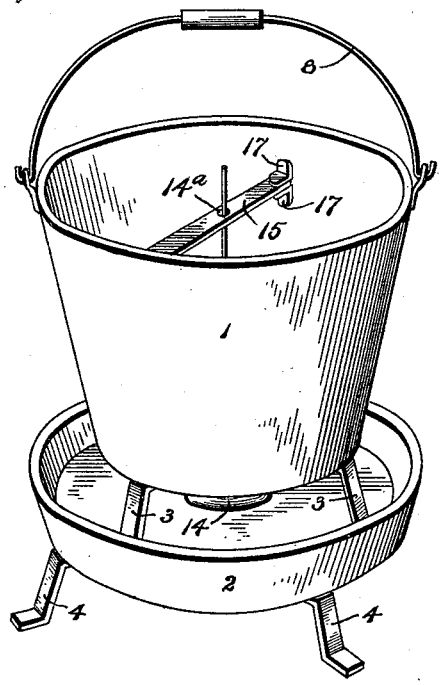
Figure 2:
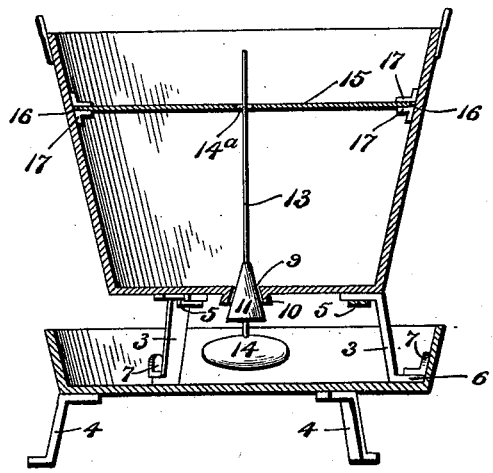
Figure 3:
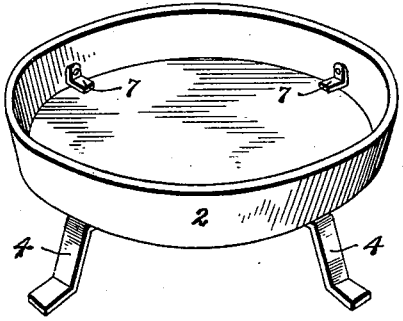
Figure 4:
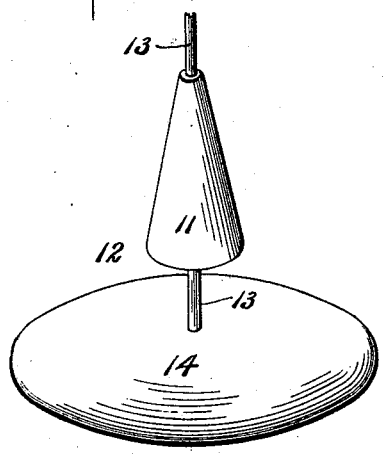

In the drawings, Figure 1 is a perspective view of a drinking-fountain constructed in accordance with our invention. Fig. 2 is a vertical central section of the same. Fig. 3 is a detail view in perspective of the trough or receptacle. Fig. 4 is a similar view of the float-operated valve.

Similar numerals of reference indicate corresponding parts in all the figures of the drawings.

1 designates a reservoir, as a bucket, which is disposed over and removably attached to a horizontal pan-like trough or receptacle 2, said reservoir or bucket being provided with a plurality of legs 3 to rest upon the bottom or floor of the trough or receptacle and the latter being preferably provided with supports 4, whereby its bottom or floor is elevated slightly above the level of the ground or other surface upon which the fountain is arranged. The outer extremities of the legs 3 are arranged in such positions as to bear against the side wall of the trough or receptacle, whereby when the reservoir or bucket is arranged in operative position lateral displacement independently of the trough or receptacle is prevented by contact of the legs 3 with the wall of the trough. Attached to this wall of the trough are clips or lugs 7, which extend inwardly at an interval from the floor or bottom of the trough equal to the thickness of the feet 6 at the lower extremities of the legs 3, whereby when the legs are seated upon the bottom of the trough a partial rotation of the reservoir will cause the legs to interlock with said clips or lugs, and thus prevent vertical displacement of the reservoir. The legs 3 are preferably attached to the bottom of the bucket by means of metal straps 5, and the bucket is preferably provided with the usual bail 8.

Formed in the bottom of the reservoir or bucket is a downwardly-flared valve-seat 9, communicating with the interior of the reservoir and extended to form a collar 10 for the reception of a cone valve 11, the elevation or depression of this valve being designed, respectively, to close or open the seat, and thus allow water to flow from the reservoir into the receptacle or check discharge, as required. In order to control the position of this valve, we employ a float 14, located directly below the valve and within the trough or receptacle, whereby it is affected by the level of the contents of the latter. Thus when the trough becomes empty the float is depressed to open the valve and allow a fresh supply of water to flow from the reservoir, and when the level of the water in the trough or receptacle rises to a certain point the elevation of the float closes the valve, and thus cuts off the supply.

The valve is removably fitted in the seat and is only held from accidental displacement by the bottom of the trough or receptacle, which is arranged in the path of the downward movement thereof, thus preventing displacement by stock, and in order to guide the valve in its vertical movement we employ a stem 13, fitting in a guide-opening 14$^a$ in a cross-bar 15, arranged horizontally in the reservoir and terminally engaged in seats 16, formed by means of brackets 17, attached to the side walls of the reservoir. This crossbar is detachable from the bucket to facilitate the cleansing of the interior thereof, and when it is desired to refill the reservoir it may be detached from the trough or receptacle and conveyed to the point of water-supply without removing the trough or receptacle, thus avoiding the weight incident to carrying the trough and the removal of the water from the reach of fowls during the filling operation. This detachment also avoids the necessity of emptying the trough or receptacle when it is desired to refill the reservoir or bucket. The latter is simply detached and carried in a manner similar to an ordinary water-bucket to the pump or other source of supply, the valve being held seated meanwhile by grasping the upper extremity of the stem 13. When the parts are in their normal or operative positions, the valve-float is protected from the attacks of stock by its arrangement under the center of the reservoir or bucket and between the floor of the same and the floor of the trough or receptacle and also by the fact that the supporting-legs 3 are arranged in an annular series around said float.

Various changes in the form, proportion, and the minor details of construction may be resorted to without departing from the spirit or sacrificing any of the advantages of this invention.

Having described our invention, what we claim is—

1. A drinking-fountain for fowls, comprising separable parts or members consisting, respectively, of a flat open-topped or pan-like receptacle having a horizontal floor, and a reservoir or bucket having a bottom of smaller diameter than the receptacle and adapted to be seated removably in the receptacle, the bottom of the reservoir being elevated above the floor of the receptacle by means of supporting-legs on the former, in combination with an upwardly-closing valve fitted in an opening in the bottom of the reservoir and having an attached float disposed between the planes of the bottom of the reservoir and the floor of the receptacle whereby the contents of the receptacle hold the valve normally closed, substantially as specified.

2. A drinking-fountain for fowls having a flat-bottomed trough or receptacle provided upon its side walls with inwardly-extending clips spaced from the floor or bottom, a reservoir or bucket removably mounted upon the floor of the trough or receptacle and having supporting-legs provided with feet to interlock with said clips and adapted to be disengaged therefrom by a partial rotation of the reservoir or bucket, said reservoir or bucket being provided in its floor with an outlet-opening, a valve seated in said outlet-opening and having a controlling-float arranged within the trough or receptacle, and a stem attached to the valve and extended upwardly to a point near the top of the reservoir or bucket, substantially as specified.

In testimony that we claim the foregoing as our own we have hereto affixed our signatures in the presence of two witnesses.

SHERMAN J. HENDRIX.
HOBERT E. FILER.

Witnesses:
FRED M. NEWELL,
GEORGE L. PRIDE.